US009661087B1

(12) United States Patent
Lewis et al.

(10) Patent No.: US 9,661,087 B1
(45) Date of Patent: May 23, 2017

(54) NOTIFYING USERS THAT WERE EARLY CONSUMERS OF POPULAR MEDIA CONTENT

(71) Applicant: Google Inc., Mountain View, CA (US)

(72) Inventors: Justin Lewis, Marina del Rey, CA (US); Gavin James, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 750 days.

(21) Appl. No.: 14/100,631

(22) Filed: Dec. 9, 2013

(51) Int. Cl.
G06F 15/16 (2006.01)
G06F 15/173 (2006.01)
G06Q 30/00 (2012.01)
H04L 29/08 (2006.01)

(52) U.S. Cl.
CPC ................... H04L 67/22 (2013.01)

(58) Field of Classification Search
CPC ......... H04L 51/04; H04L 67/18; H04L 67/22; H04L 51/32; H04L 43/00; G06Q 20/00; G06Q 30/00
USPC ....... 709/206, 204, 250, 224; 705/14.66, 66, 705/14.13, 7.32
See application file for complete search history.

(56) References Cited

U.S. PATENT DOCUMENTS

| 2011/0153502 A1* | 6/2011 | Jean-Claude | ...... G06Q 20/3672 705/66 |
| 2012/0109728 A1* | 5/2012 | Sparks | ............... G06Q 30/0214 705/14.16 |
| 2016/0034970 A1* | 2/2016 | Musil | ................. G06Q 30/0269 705/14.66 |

OTHER PUBLICATIONS

"Xbox Live," Wikipedia.org, 22 pages, http://en.wikipedia.org/wiki/Xbox_Live#Gamerscore, Last accessed Nov. 22, 2013.
"My Trophies: Get trophies. Get recognition." PlayStation Network, 3 pages, http://us.playstation.com/community/mytrophies/, Last accessed Nov. 22, 2013.
"Why Everyone Got LinkedIn Top 5 Percent Email," Best Hubris, 3 pages, http://besthubris.com/news/why-everyone-got-linkedin-email/, Last accessed Nov. 22, 2013.

* cited by examiner

*Primary Examiner* — Ario Etienne
*Assistant Examiner* — Sahera Halim
(74) *Attorney, Agent, or Firm* — Byrne Poh LLP

(57) ABSTRACT

Systems and methods are provided for notifying a user regarding early consumption of a popular content item. In one or more aspects, a system includes an identification component configured to identify a user that was among a first X percentage of users to access a content item that is ranked as a popular content item based in part on total number of times the content item was previously accessed, a notification generation component configured to generate a notification identifying the user as being among the first X percentage of users to access the popular content item, and a notification posting component configured to send the notification to a device or an account of the user.

26 Claims, 14 Drawing Sheets

NOTIFYING USERS THAT WERE EARLY CONSUMERS OF POPULAR MEDIA CONTENT

TECHNICAL FIELD

This application generally relates to systems and methods for notifying users that were early consumers of popular media content.

BACKGROUND

Sharing content amongst users is an incredibly important part of a content provider's success. For example, as users view, share and re-share content, the more popular the content will become, increasing total amount of viewers of the content, enhancing value of association of advertisements with the content and increasing overall viewership at the content source. Accordingly, content providers are constantly searching for ways to encourage users to view their content and employ social media to share and promote their content.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
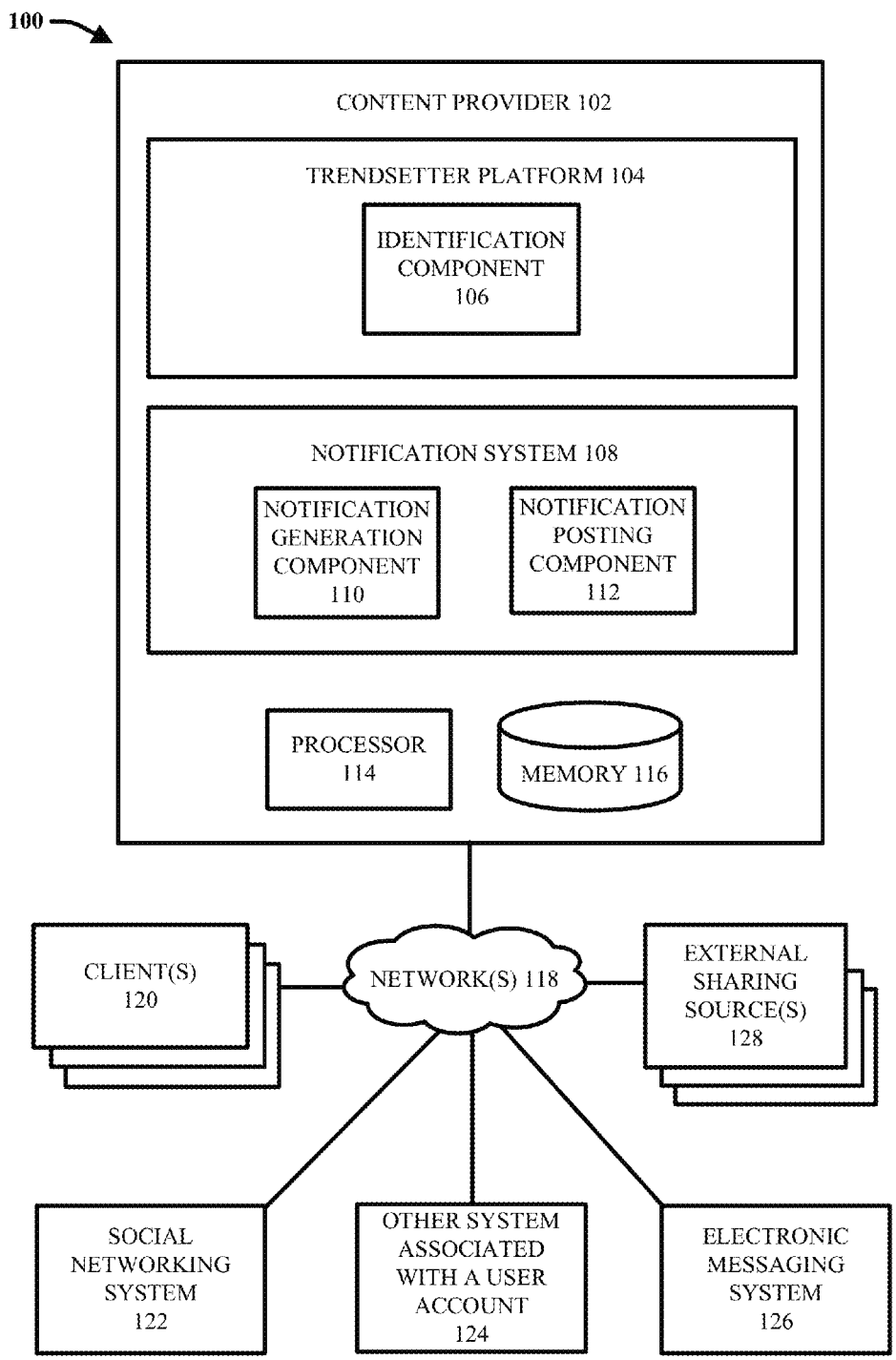
FIG. 1 illustrates an example system for notifying users that were early consumers of popular media content in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for notifying users that were early consumers of popular content items. The phrase "going viral" has become a popular phrase employed to refer to a phenomenon where Internet based content becomes extremely popular in a relatively short amount of time. Generally, content is considered to have gone viral when it resonates to an extent that its popularity grows geometrically if not exponentially, and the content ends up becoming the latest hit item across the Internet. In other words, for example, content has gone viral when it is liked, shared, reshared, republished, commented on, blogged about, earns more views than ever imagined, and eventually becomes talked about outside of the Internet world.

When people think of the term "viral" they often think of viral videos. But videos are only one form of content that can go viral. In general, almost anything can go viral on the Internet, whether its a photo, an animation, an article, a quote, a tweet, a person, an animal, an idea, an argument, a coupon, an event, or anything else. Any type of content has the power to go viral if it appeals enough to the masses and is shareable electronically (e.g., via the Internet).

Whether a content item has become so popular to be considered viral amongst the masses or whether it has become popular amongst a smaller group of people, individuals that were among the first to discover a popular content often like to be recognized for their intuition and contribution to popularity of the content item. In view of this observation, the subject disclosure provides a mechanism to encourage users to seek out and promote (e.g., share) content before it becomes popular. In particular, systems and methods are disclosed that reward users for accessing a popular content item prior to a majority of other users that accessed content item. For example, a user can be identified and rewarded for being among the first X percent of users (out of a total number of users) to access, view, or consume a content item that has risen to a classification as viral or "popular." In an aspect, systems and methods are provided that first identify users that were early consumers of popular content based on an order in which a total number of users consumed the content. The early consumers (also referred to herein as "trendsetters)," can then receive a notification informing them of their status as early consumers of a particular content item. For example, a user that was among the first 1% of users to view a video that went viral can receive an email notification informing the user that he or she was among the first 1% of users to view the video.

In an aspect, an early consumer notification can provide the user with an award for being an early consumer. For example, the award can include a coupon or cash. In another example, the reward can include a trophy or badge that can become associated with a profile of the user and serves as symbol to inform other users about the user's status as an early consumer or trendsetter. The user can further brag about his or her trendsetter status by sharing the trophy or badge with others at social media/networking sources.

By recognizing and rewarding users for being early consumers of content, more users will be incentivized to seek out and share content that they think will become popular. As a result, content providers can employ the disclosed systems and methods to encourage users to view and share content provided by the content providers. In addition, content providers can influence and control, in part, what content will become popular or viral by suggesting content to users that "may" go viral.

In one or more aspects, a system is provided that includes an identification component configured to identify a user that accessed a content item, ranked as a popular, prior to a majority of other users that accessed the content item, wherein the content item is ranked as popular based in part on total number of times the content item was previously accessed, a notification generation component configured to generate a notification identifying the user an early consumer of the content item, and a notification posting component configured to send the notification to a device or an account of the user.

In another aspect, a method is disclosed that includes identifying a user that was among a first X percentage of users to access a content item that is ranked as a popular content item based in part on total number of times the content item was previously accessed, generating a notification identifying the user as being among the first X percentage of users to access the popular content item, and sending the notification to a device or an account of the user.

Still in yet another aspect, A tangible computer-readable storage medium is provided that comprises computer-readable instructions that, in response to execution, cause a computing system to perform various operations. These operations can include identifying a user that was among a first X percentage of users to access a content item that is ranked as a popular content item based in part on total number of times the content item was previously accessed, generating a notification identifying the user as being among the first X percentage of users to access the popular content item, and sending the notification to a device or an account of the user.

Referring now to the drawings, with reference initially to FIG. 1, presented is a diagram of an example system 100 for notifying users that were early consumers of popular media content, in accordance with aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes content provider 102, one or more clients 120, and various other networked systems/sources including social networking system 122, another system associated with a user account 124, electronic messaging system 126, and external sharing sources 128. System 100 can include one or more networks 118 for connecting content provider 102, the one or more clients 120 and the various other networked systems/sources. Content provider 102 can include a trendsetter platform 104 for identifying users that were early viewers of content provided by content provider 102 and notification system 108 for notifying the users regarding their respective status as early content viewers. Content provider 102 can include memory 116 for storing computer executable components and instructions and processor 114 to facilitate operation of the instructions (e.g., computer executable components and instructions) by content provider 102.

Content provider 102 can include an entity configured to provide content or content items to a user at a client device 120 via a network 118 (e.g., the Internet). For example, content provider 102 can include a website or application configured to present pictures, articles, blogs, videos, or other types of content items to client devices 120 via a network 118. According to this example, the content provided by the website or application can be configured for downloading, streaming or merely viewing at a client device 120 via the network 118. In another aspect, content provider 102 can include an information store that provides access to data included in the information store via a network 118.

As used herein, the term content item refers to any suitable data object that can be linked to and accessed or otherwise shared via a network and includes but is not limited to: documents, articles, messages, webpages, programs, applications, and media items. In an aspect, a content item includes a data object that can be identified by a URL. The term media content or media item can include but is not limited to: video, live video, animations, video advertisements, music, music videos, sound files, pictures, and thumbnails. In some aspects, the term media content or media item includes a collection of media items, such as a playlist including several videos or songs or a channel.

A channel can be data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

In an exemplary embodiment, content provider 102 includes a streaming media provider configured to provide streamed media to client devices 120 over a network. The media can be stored in memory associated with the media provider (e.g., memory 116) and/or at various servers employed by media provider and accessed by client devices 120 using a networked platform (e.g., a website platform, a cellular application) employed by the media provider. For example, the media provider can provide and present media content to a user via a website that can be accessed by a client device 120 using a browser. In another example, the media provider can provide and present media to a user via a mobile/cellular application provided on a client device 120 (e.g., where client device 120 is a smartphone or the like).

Client device 120 can include any suitable computing device associated with a user and configured to receive access content provider 102 via a network 118 and/or receive notifications from notification system 108 via a network. For example, a client device 120 can include a desktop computer, a laptop computer, a television, an Internet television, a mobile phone, a smartphone, a tablet personal computer (PC), or a personal digital assistant (PDA). As used in this disclosure, the terms "content consumer" or "user" refer to a person, entity, system, or combination thereof that employs system 100 (or additional systems described in this disclosure) using a client device 120. The one or more networks 118 via which one or more components of system 100 can connect can include wired and wireless networks, including but not limited to, a WAN (e.g., the Internet or a cellular network), a local area network (LAN) or a personal area network (PAN). For example, client device 120 can communicate with content provider 102, social networking system 122, electronic messaging system 126, or another system associated with a user account 124, (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

Content provider 102 includes trendsetter platform 104 to facilitate identifying and rewarding users for being early consumers of popular content provided by content provider 102. In an aspect, trendsetter platform 104 can be remote from content provider 102 and accessed by content provide 102 via a network 118. The term trendsetter is used herein to refer to a user that was an early consumer of popular content. In essence, a trendsetter refers to a user that accessed or viewed a content item before it became popular. In an aspect, a trendsetter can merely include users that were early consumers of popular content. However, in another aspect, a trendsetter can refer to a user that not only was an early consumer of the popular content, but that facilitated the rise in popularity of the popular content based on sharing the popular content, liking the popular content, commenting on the popular content, etc. According to this aspect, trendsetters that were responsible for the rise in popularity of a popular content item can be differentiated from those who were merely early viewers of the content item. In addition, trendsetters can be recognized for their level of contribution to the rise in popularity of a content item.

As used herein, the term "popular" is used to describe a relative level of heightened interest a group of users have expressed in a content item with respect to other content items. Popularity is a relative term that can be broadly defined. For example, a content item can be considered popular if it is has been accessed or viewed by a large number of users. In another example, a content item can be considered popular amongst a specific group of users (e.g., as defined based on a common interest, a common demographic, a social affiliation, etc.) if it has been accessed or viewed by a relatively large number of users affiliated with the specific group. In yet another example, a content item can be considered popular if it has been re-accessed/re-viewed or shared by a large number of total users or a large number of users within the particular social group. Still in yet another aspect, a content item can be considered popular if it has received more attention in the form of commenting on the content item, sharing of the content item or sale of the content item, with respect to other content items related to the content item.

Sharing of a content item refers to sending or providing information identifying the content item from one user to another user. For example, sharing a content item can include sending another user a link to a content item or a copy of the content item. According to this example, the a user could send an email or short messaging service (SMS) message with a link to or copy to the content item. In another example, sharing a content item can include posting or publishing a link or copy of the content item, located at a first content source, at a second source that is accessible to one or more other uses. According to this example, a link to or copy of a content item located at and provided by content provider 102 can be shared by a user of a client device 120 at an external sharing source 128. An external sharing source 128 can include a content source that can receive and publish copies of content items and/or links to content items provided by content provider 102. For example, external sharing source 128 can include a social networking profile, a website, or a blog. According to this example, a user of a client device 120 can view a video provided by content provider 102 and post a link or embedded version of the video at his or her social networking profile to effectuate a share of the content item. Sharing of content items can also include re-sharing of a shared content item. For example, sharing can include forwarding a shared link to a content item, re-posting a link to a content item, emailing a shared link to a content item etc.

In an aspect, a content item is classified as popular based on one or more of the following factors, including but not limited to: number of times the content item was accessed, frequency of access of the content item, recency of access of the content item, number of users that accessed the content item, number of times the content item was re-accessed by a same user, frequency of re-access, number of times the content item was shared, where the content item was shared, source where the content item was accessed, level of commenting on the content item, location of users that accessed the content item, type of device employed to access the content item, or type of users that accessed the content item. For example, a content item can be classified as popular based on the content item having been accessed over a threshold number of times or by over a threshold number of users. According to this example, a video could be considered popular after it was viewed over a threshold number of times (e.g., 100 times, 1000, times, 100,000 times, 1 million times, etc.). In an embodiment, content items classified as popular for which trendsetter platform 104 processes with respect to identifying user that were early viewers of the content items, are predetermined. In another embodiment, discussed infra with respect to FIG. 5, trendsetter platform 104 can determine or infer content items that are classified as popular.

Identification component 106 is configured to identify one or more users that are "trendsetters" or early consumers of popular content items with respect to order in which a plurality of users first consumed or accessed the popular content items, respectively. In particular example, identification component 106 can receive or access historical user data associated with a popular content item that indicates points in time when respective users initially accessed the popular content item. Based on this historical user data, identification component 106 can identify users that were among the earliest users to access the content item with respect to the total number of users who accessed the content item and/or the total number of times the content item was accessed or viewed.

The total number of users who accessed the content item can be a fixed number representative of the total number of users that accessed the content item at a point when it was classified as popular. For example, where a content item is deemed popular after it was accessed by 1 million users, the total number of users out of which early consumers are based will be 1 million, regardless of whether the content item continues to be accessed by additional users. Identification component 106 can also consider where a content item was accessed when counting number of times a content item was accessed and/or number of users to access the content item. For example, identification component 106 can analyze historical user data regarding access of a popular content item at different sources that include links, embedded versions (e.g., embedded videos), and/or syndicated displays of a popular content item provided by content provider 102. For instance, identification component 106 can receive information regarding access a popular content item, provided by content provider 102, via a link to the content item provided at an external sharing source 128 or a social networking system 122.

In an aspect, identification component 106 can identify users that were early consumers of a popular content item provided by content provider 102 based on an order of a total number of users to access the content item at the various sources the content item is provided (e.g., as a link, as an embed, as a syndicated version, etc.). For example, identification component 106 can identify user Tom as being among the first 10% of all users to access a popular content item amongst all users to access the content item regardless of the source at which the content item was accessed. In another aspect, identification component 106 can identify users that were early consumers of a popular content item at a particular source or subset of sources. For example, where Tom accessed the content item via a link to the content item provided at a social networking source 122, identification component 106 can also identify Tom as being among the first 5% of user to access the content item at the social networking source 122.

In an aspect, identification component 106 is configured to identify one or more users that were within a first X percentage of users to access or consume a popular content item with respect to the total number of users who accessed the content item (e.g., at a single source or across all sources where the content item is provided via a link or embed) and/or the total number of times the content item was accessed or viewed, where X can vary (e.g., X can be 0.1%, 0.5%, 1%, 5%, 10%, etc.). For example, where the content item is a popular video provided by content provider 102, identification component 106 can identify the first 1.0% of users to view the video based on watch histories of respective users who viewed the video. According to this example, where a popular video was viewed by 1 million users, identification component 106 can identify the first 10,000 viewers. Identification component 106 can also apply a threshold viewing requirement for the popular video in order for a user to be considered a viewer. For example, the threshold could require a user to watch the entire video, at least 75% of the video, at least 50% of the video, at least 25% of the video, etc before considering the user to have "viewed" the video. (In another example, this threshold viewing requirement can be built in to counting views in association with classifying the video as popular).

In another aspect, identification component 106 can rank users who accessed a popular content item based on their respective order of access. For example, where 1000 users accessed a content item, identification component 106 can order the users from 1-1000 based on the order in which the respective users accessed the content item, where the first user to access the content item is ranked as user 1 and the last user to access the content item is ranked as 1000. According to this aspect, identification component 106 can identify the first 1% of users to have accessed the content item (e.g., the first 10 users) and further identify the places at which (e.g., first place, second place, third place . . . tenth place) the respective user included in the first 1% accessed the content item.

In another aspect, identification component 106 can identify a position at which a user accessed a popular content item with respect to other users that accessed the content item as a function of percentage of total users that accessed the content item and/or as a function of percentage of total times the content item was accessed or viewed. For example, identification component 106 can identify a user having had accessed the content item at a point where 12% of the total users had accessed the content item or at a point where the 55% of the total users that accessed a content item. According to this aspect identification component 106 can identify a first X percentage of users that accessed, viewed or consumed a popular content item and further identify the relative percentages each of those users included within the first X percentage of the users accessed the content item. For example, identification component 106 can identify the first 15% of users to have viewed a video (as a function of first watch percentile with respect to the total number of views or viewers), and further determine the relative position of each or the users included within the first 15%.

In an aspect, identification component 106 can be configured to identify users who were early consumers of a subset of a set of popular content items. For example, identification component 106 can analyze a set of content items classified as the top N (where N is a number) most popular content items of the week, month, quarter, year, etc. In another example, identification component 106 can analyze the top X content items of a particular category, such as a video genera or photography category. In another example, identification component 106 can analyze a set of popular content items considered popular amongst a group of users grouped based on common factor such as a common interest, demographic, location, language, etc.

According to this aspect, identification component 106 can analyze a set of videos classified as the top new 20 videos with the most views in the past year or the top 10 most popular celebrity moments in the past month. Identification component 106 can further analyze historical user data regarding user access or consumption of the respective content items included in the set and identify one or more users that were among the first X percent of users to access one or more of the content items included in the set. In furtherance to the above example, identification component 106 can identify a user that was among the first X percent of users to view to the video rated as number 1 of the year, the video rated number 7 of the year and the video rated number 9 of the year. Similarly, identification component 106 can identify a user that was among the first X percent of users to read articles 4, 6 and 7 of the top 10 articles describing the top 10 celebrity moments of the month.

Identification component 106 can further filter users based on the number of content items included in a set which the respective users accessed the respective first access percentile positions of the users with respect to the content items. Also according to this aspect, identification component 106 can analyze a user's total early consumption activity with respect to a set of popular content items and rank users who were early consumers of at least one content item included in the set as a function of the number of content items included in the set which the respective users consumed and the respective first consumption percentile at which the respective users consumed the respective content items. In other words, with respect to a set of popular content items, identification component 106 can determine a user's all around "trendsetter" score representing how many of the content items the user has accessed and how early (with respect to order of access out of a total number of users) the user accessed the respective content items. Identification component 106 can further identify users with the top trendsetter scores with respect to a set of popular content items.

In association with identifying users that were among the top X percentage of all users to access of view a content item, identification component 106 can further group users based on various common factors and identify users that were among the first X percent of users included in a particular group to access the content item. For example, identification component 106 can identify the first X percent of users included in a particular demographic to access a popular content item or the first X percent of users. According to this example, identification component 106 can identify the first X percent of women to have viewed a popular video, the first X percent of top research professors to have accessed a popular scientific study, or the first X percent of users living outside of Florida to have viewed popular news story based in Florida.

Content provider 102 can employ notification system 108 to generate, aggregate, and deliver notifications and personal scores to users regarding popular content items the respective users were early consumers of. For example, using notification system 108, media provider 102 can generate and send an early consumption notification message (e.g., as an email, SMS text message, feed item, etc.) to a user that was among the first 1% of users to view a video that went viral (e.g., as determined by identification component 106) informing the user that he or she was among the first 1% of users to view the video.

Notification generation component 110 is configured to generate notification messages (referred to herein as early consumption notification messages) for sending to users regarding early consumption of popular content items. In an aspect, an early consumption notification can include information identifying a popular content item a user was an early consumer of. The notification can also provide additional information about the content item which the user was an early consumer of and a particular score or ranking the user earned based on the point at which the user consumed the popular content item.

For example, notification generation component 110 can generate notifications for all users identified by identification component 106 as being within the first 1% of users to access a popular content item. The notifications can respectively identify the popular content item and indicate that the respective users were within the first 1% of user to access the popular content item. In another example, notification generation component 110 can be configured to generate notifications for all users that were amount the first 10% of users to access a popular content item, as identified by identification component 106. The notifications for the respective users included within the first 10% can include information identifying the popular content item and information indicating personal scores for the respective users with respect to where the respective users placed amongst the first 10% (as determined by identification component 106). According to this example, a notification for a user included within the first 10% can include information identifying the content item, indicating the user was within the first 10% of users to access the content item, and identifying the user as being user number 44 out of the 100 users included in the first 10% of users to access the content item (e.g., where total users is 1000), or as being at percentile 4.4% of users to access the content item.

Notification generation component 110 can be configured to generate notifications with any type of information capable of being determined by identification component 106. For example, as discussed above, in addition to merely identifying the first X percent of users to have identified a popular content item and respective placements of those users included within the first X percent, identification component 106 can analyze and rank early access of a popular content item amongst a specific cluster or group of users. For example, identification component 106 can identify the first X percent of users associated with a particular demographic (e.g., age, race, gender, political affiliation, religion, etc.), a particular social group, a particular location, a particular interest or content preference, etc. According to this example, notification generation component 110 can generate notifications with information filtered based on the various user classifications or clusters. For instance, a notification can indicate a user was among the first 10% of all users to view a video, among the first 3% of all girls to view the video, and among the first 1% of all girls located in the United States to view the video.

In another example, identification component 106 can analyze a set of popular content items and identify information about users who were early consumers of one or more popular content items included in the set. For example, identification component 106 can analyze the top 10 videos of the year and identify users that were among the first X percent of users to view one or more of the top ten videos. For each of these users, notification generation component 110 can generate a notification identifying which videos of the top ten videos the users were among the first X percent to view and which of the videos the users have not viewed yet. In another aspect, the notification can identify respective watch percentiles of the users with respect to each of the videos included in the top 10 that they have viewed, regardless as to whether the users were within the first X percentile. For example, a notification could indicate the user was among the first X percent of users to view videos ranked number 1, number 5, and number 6; the user watch video ranked number 2 at the 12th percentile, video ranked number 3 at the 40th percentile, video ranked number 8 at the 17th percentile; and that the user has not yet seen videos ranked number 4, 7, 9 and 10.

Also according to this example, identification component 106 can analyze a user's total early consumption activity with respect to a set of popular content items and rank users who were early consumers of at least one content item included in the set as a function of the number of content items included in the set which the respective users consumed and the respective first consumption percentile at which the respective users consumed the respective content items. In other words, with respect to a set of popular content items, identification component 106 can determine a user's all around "trendsetter" score representing how many of the content items the user has accessed and how early (with respect to order of access out of a total number of users) the user accessed the respective content items. Identification component 106 can further identify users with the top trendsetter scores with respect to a set of popular content items. According to this aspect, a notification can include a user's trendsetter score and identify how the user ranked as a trendsetter amongst other trendsetters associated with the set.

Notification generation component 110 can also include other information in a notification regarding a popular content item a user was an early consumer of, such as facts about when the content time was released, how many total users have accessed the content item to date, how popular the content item is compared to other currently popular content items or other content items deemed popular within the same year, demographics of users that access the content item, links to the content item, etc. Notification generation component 110 can also include information in a notification regarding other content items that are trending and/or that were also considered popular that the user did not access.

For example, a notification can include information identifying a user as being among the first 1% of user to access video "Monster Jam," which was the 8th most popular video of 2013. The notification can also identify the other videos deemed popular in 2013 (e.g., the top 20 most popular video) that the user has not viewed and recommends that the user view those videos. According to this example, videos with many views are typically better monetized than videos with fewer views. For instance, videos with many views are highly sought after by advertisers to associate advertisements with. Thus, suggesting users view such popular videos they have not viewed yet in association with an early consumption notification can serve as a good mechanism to encourage users to watch content that advertisers have paid a premium to associated advertisements with.

In an aspect, rather than just including information related to identifying a user as an early consumer of a popular content item, an early consumer notification can provide the user with an award for being an early consumer. For example, the award can include a coupon or cash. In another example, the reward can include a trophy or badge that can become associated with a profile of the user and serves as symbol to inform other users about the user's status as an early consumer or trendsetter. The user can further brag about his or her trendsetter status by sharing the trophy or badge with others at social media/networking sources. Inclusion of awards in early consumer notifications is described in greater detail with respect to FIG. 6.

Notification posting component 112 is configured to send early consumption notification messages generated by notification generation component 110 to the appropriate recipients (e.g., the users whom are the early consumers of popular content items as identified in the respective early consumption notification messages). In an aspect, notification posting component 112 can be configured to send out all early consumption notification messages generated by notification generation component 110. In another aspect, notification posting component 112 can be configured to send a subset of the notification messages generated by notification generation component 110 based on first watch percentile. For example, notification posting component 112 can be configured to send notifications messages to users that were among the first X percent of user to access a content item, where notification generation component 110 generated notification messages for users of various first watch percentiles above X percent.

In an aspect, notification posting component 112 can send out notification messages in response to generation by notification generation component 110, according to a predetermined schedule, and/or based on recency of a previously sent early consumption notification messages and information to be included in a current notification message. For example, identification component 106 can be configured to continuously scan historical user data regarding access of popular content items (e.g., watch histories of users where the content items are videos), to identify users that are within the first X percent of user to access a content item. In response to identification, notification generation component 110 can generate an early consumption notification for the respective users and notification posting component 112 can send the notification to the respective users. In another example, notification posting component 112 can be configured to send out notification messages once a day, once a week, once a month, once a year, etc. According to this example, notification generation component 110 can also be configured to generate notification the notification messages once a day, once a week, once a month, once a year, etc. Notification generation component 110 can further aggregate information regarding user early consumption of content items identified by identification component 106 within time periods between sending of early consumption notification messages. The aggregated information can then be included in a single notification message in a summary format. For example, notification generation component 110 can generate an early consumption notification message that summarizes the content items for which a user was an early consumer of within the past week, month, quarter, year, etc.

In another aspect, notification posting component 112 can be configured to send out a notification message to a user based on recency of a previously sent out notification message to the user and/or information that is included in the notification message. For example, notification posting component 112 can be configured to determine when a most recent notification message was sent to a particular user and based the recency of the sending, the notification posting component 112 can choose to send a current notification or postpone sending the current notification. According to this example, notification posting component 112 can be configured to implement a minimum time period between sending of subsequent notification messages (e.g., at least one day, at least one week, etc.) so as to not annoy the user with a constant bombardment of notification messages.

Similarly, notification posting component 112 can determine whether to send a notification based on the content to be included in a current notification. For example, notification posting component 112 can apply a minimum quota regarding number of content items for which a user was within the first X percent of users to access the content item that are identified in a notification prior to sending the notification. According to this example, notification posting component 112 can be configured to send a notification if at least N number of content items are identified in a notification. In another example, notification posting component 112 can determine whether to send a notification based on recency of sending of a previous early consumption notification and number of content items to be identified in a current notification. For example, notification posting component 112 can determine that because a previous early consumption notification was sent within the last week and the current early consumption notification will only identify one new content item for which the user was an early consumer of, the current notification should be postponed.

When postponing sending of a current early consumption notification, notification posting component 112 can direct notification generation component 110 to aggregate information that was to be included in the current notification with a future notification. In another aspect, notification generation component 110 can postpone generating a notification message until notification posting component 112 has determined that a notification message should be sent (e.g., based on the information to be included in the notification message and recency of a prior early consumption notification message).

Notification posting component 112 is configured to send an early consumption notification message to a device 120 or account of a user that is associated with the early consumption notification message (e.g., the user identified in the early consumption notification message as an early consumer of a popular content item). In an aspect, notification posting component 112 can provide a notification regarding early consumption of a content item by a user directly to the user's client device 120. For example, notification generation component 110 can configure an early consumption notification message for display at a client device 120 of the relevant user via a notification system or application provided at the client device 120. The notification posting component 112 can further send the notification to the client device 120 for processing thereof. According to this example, the notification can be presented to the relevant user along with various other notifications, unrelated to notifications generated by notification system 108 (e.g., unrelated to notifications regarding early consumption of a content item). In another aspect, an early consumption notification can be provided to a relevant user via a notification message sent to the client device 120 of the relevant user as an SMS message or multimedia message. According to this aspect, notification generation component 110 can configure the SMS message and notification posting component 112 can employ a short messaging service to deliver the message to the client device 120. In another aspect, notification generation component 110 can configure an early consumption notification message as an email and notification posting component 12 can employ an electronic messaging system 126 to send the email to an email account employed by a relevant user.

In yet another aspect, notification generation component 110 can configure an early consumption notification message for rendering as a feed item at an information feed owned or under the control of a relevant user. For example, the information feed can display a list of feed items representing activity associated with content sources the relevant user is affiliated with (e.g., subscribed to). In an aspect, the information feed is provided by the content provider 102 associated with the popular content item that the user was an early consumer of, as identified in the notification message.

According to this aspect, the information feed can be associated with a user account for the related user and include feed items regarding activity related to various content sources provided by the content provider 102 that the related user is subscribed to. In another aspect, the information feed can be provided at an account the user who affiliated with the early consumer notification located at an external social networking system 122 and include feed items related to other content sources (e.g., friends profiles) at the external social networking system that the related user is subscribed to. Still in yet another aspect, the information feed can be provided at an account of the related user at another system at which the related user has an account 124 that includes an information feed (e.g., an account that aggregates feed items regarding activity related to content sources the user is subscribed to and provided by various different content providers). Notification posting component 112 can identify an appropriate information feed or feeds for which to send an early content item consumption notification configured for display as a feed item and send the notification to the appropriate information feed.

Figure 2:
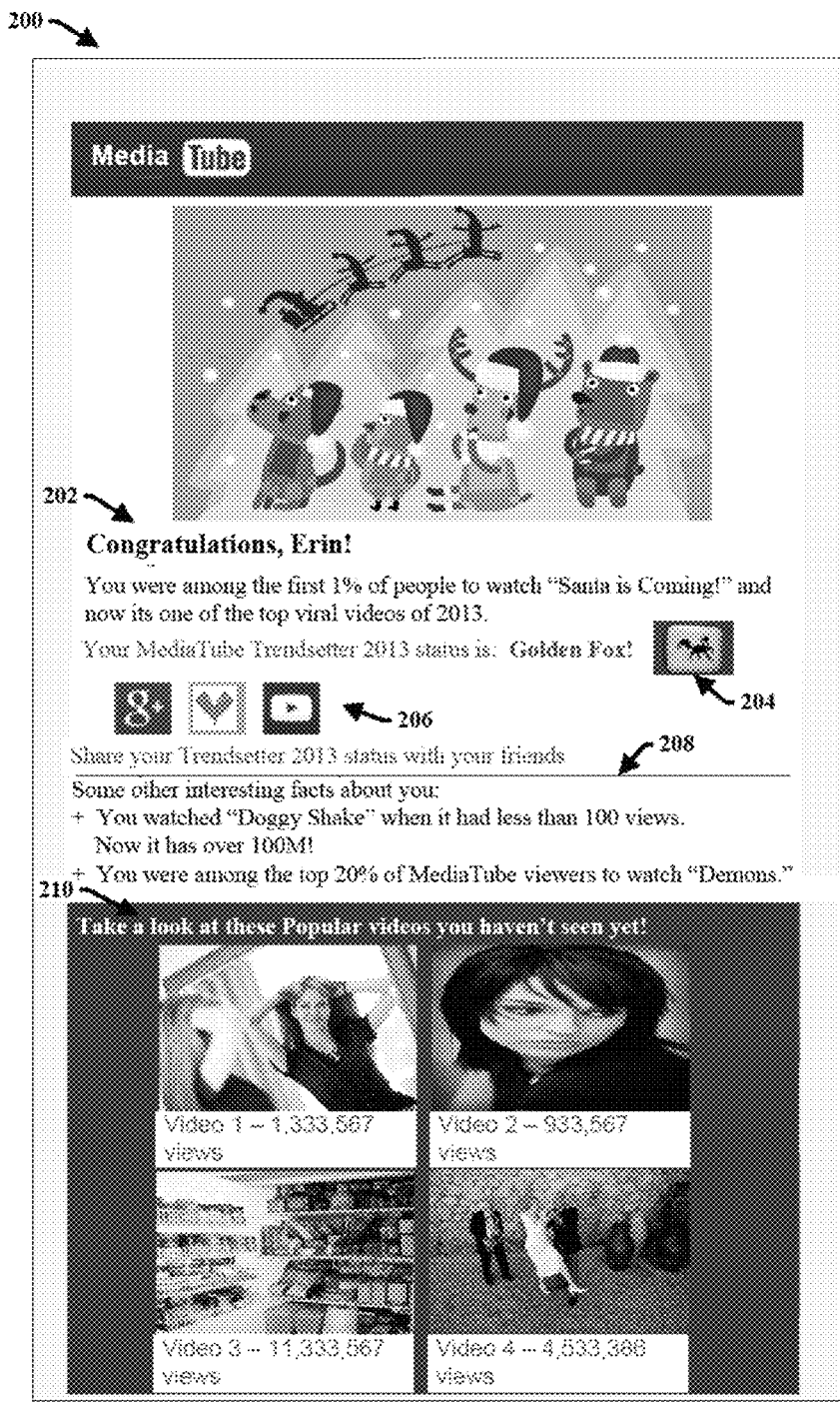
FIG. 2 presents an example electronic message that informs a user that the user was an early consumer of early of popular media content, in accordance with various aspects and embodiments described herein.
Figure 3:
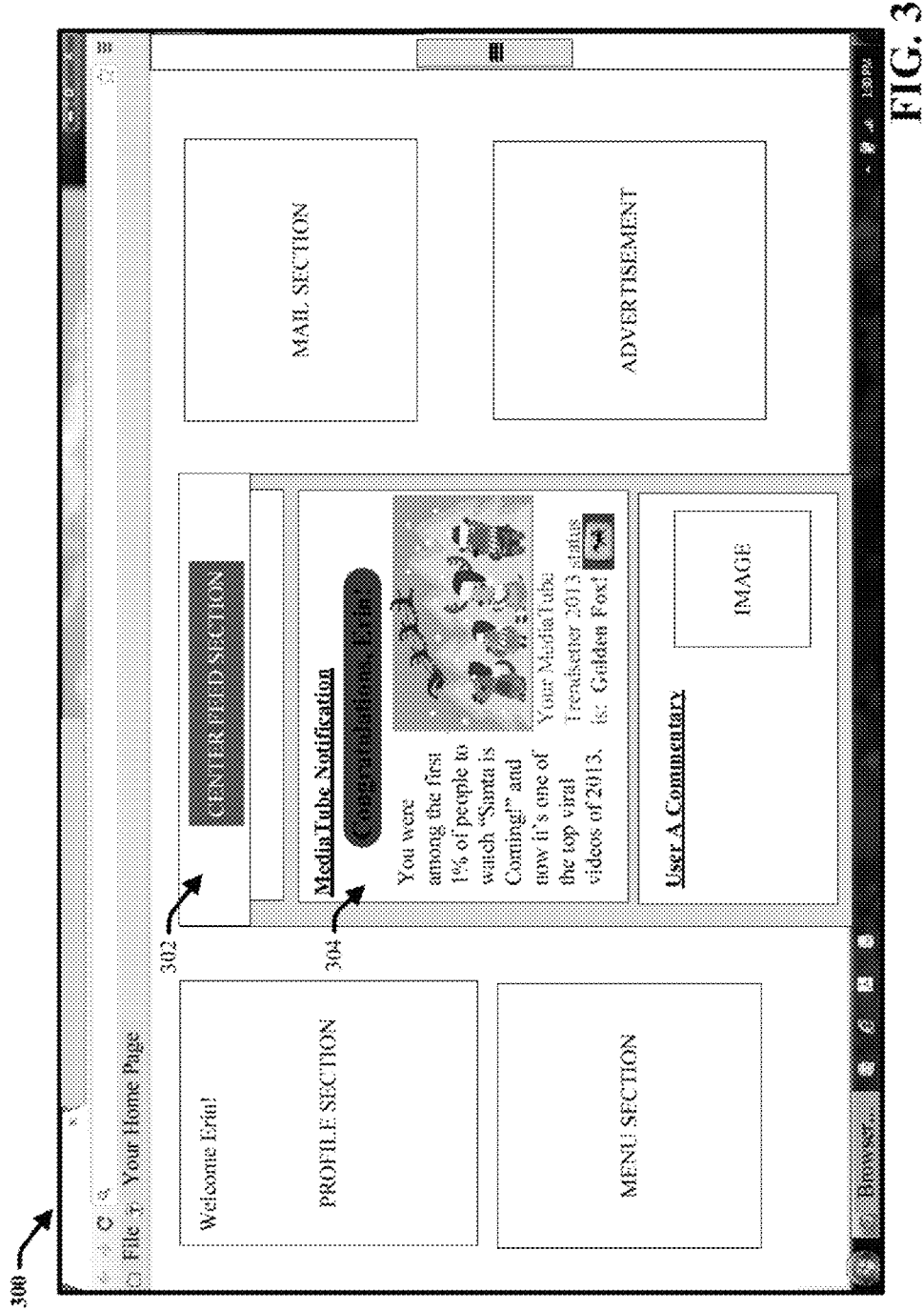
FIG. 3 presents an example user interface displaying a notification informing a user that the user was an early consumer of popular media content in accordance with various aspects and embodiments described herein.
Figure 4:
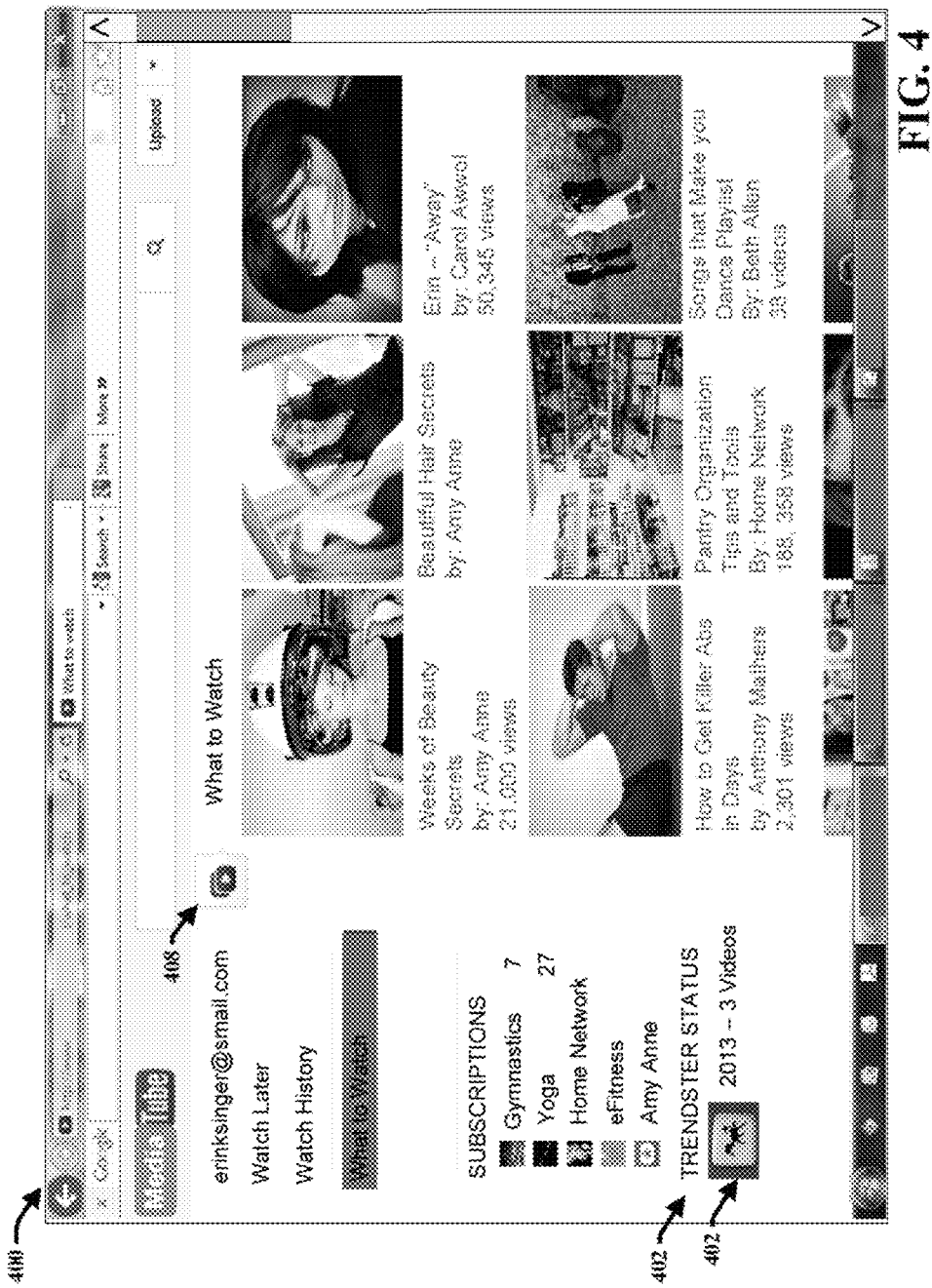
FIG. 4 presents an example user interface displaying a user homepage at a media sharing website and including a section identifying the user as an early consumer of popular media content in accordance with various aspects and embodiments described herein.

FIGS. 2-4 provide example interfaces at which notifications regarding early consumption of videos provided by a media provider are presented in accordance with aspects and embodiments described herein. The notifications are exemplified in different rendering mediums and including different types of information. Repetitive description of like elements employed in respective embodiments of systems and interfaces described herein are omitted for sake of brevity.

FIG. 2 presents an example early consumption notification message 200 in the form of an email that can be displayed at various types of client devices such as a smartphone, tablet PC, laptop PC, etc.). In an aspect, notification message 200 was generated (e.g., by notification generation component 110) and sent (e.g., by notification posting component 112) to user Erin in response to identification (e.g., by identification component 106) of Erin as being among the first 1% of user to watch the video "Santa is Coming," provided by "Media Tube." The notification message 200 includes information 202 congratulating Erin as being among the first 1% of people to watch the video "Santa is Coming" and notes that its one of the top viral videos of 2013. In an aspect, based in part on being an early consumer of "Santa is Coming," Erin can receive an award or badge that represents Erin's status as a trendsetter. For example, Erin can receive a badge 204 that indicates Erin status is "Golden Fox." In an aspect, a user's trendsetter status can accrue as a function of the number of content items for which the user is an early consumer. For example, the greater number of videos a user is an early viewer of, the higher the user's trendsetter status can become.

In an aspect, a user can share his or her trendsetter status with others. For example, icons 206 can represent hyperlinks to sharing sources (e.g., external sharing sources 128) via which a user can establish a profile and share information to a social networking community associated with the respective sharing sources. For example, Erin can select any of the icons 206 to post information identifying Erin's trendsetter status at the respective sharing sources represented by the icons. A user may want to share his or her trendsetter status with others merely to gloat. However, in some aspects, a user's trendsetter status can be used to attract followers, friends, and social popularity. In other aspects, a user can be given perks or benefits by various entities based on the user's trendsetter status. For example, in response to reaching a particular trendsetter status, the user could be given free or discounted access to information the user may have otherwise been required to a premium pay for.

Notification message 200 also includes additional information related to Erin's viewing history at Media Tube. For example, notification message 200 includes a section 208 with additional interesting facts about Erin, including the fact that Erin watched the "Doggy Shake" video when it had less than 100 views and now it has over 100 million views and the fact that Erin was within the top 20% of Media Tube viewers to watch the video "Demons." In addition, notification message 200 can include a section that suggests popular videos to Erin that Erin has not yet seen. For example, section 210 can include thumbnails representing links to popular videos provided by Media Tube that Erin has not yet seen.

FIG. 3 presents another example user interface 300 with an early consumption notification message associated with early consumption of a media item provided by Media Tube. Interface 300 presents an account of a user Erin that includes an information center feed section 302 configured to display feed items associated with content sources relevant to the Erin. The user account can be provided by a variety of systems. In an aspect, the user account is associated with Media Tube. In another aspect, the user account is associated with a social networking system. In yet another aspect, the user account can be associated with web browsing system that presents information to Erin that is relevant to various network sources the user is subscribed to or has indicated in interest in. Center feed section 302 includes a Media Tube notification generated by notification system 108 indicating that Erin was among the first 1% of people to view the video "Santa is Coming, which is now one of the top viral videos of 2013. The notification also includes information identifying Erin's Media Tube trendsetter status as "Golden Fox."

FIG. 4 presents an example user interface 400 displayed at a user device that displays information identifying a user's trendsetter status in accordance with aspects and embodiments described herein. In an aspect, interface 400 is a webpage (e.g., a homepage or other webpage) associated with an account a user has established with a media provider entitled Media Tube. Media Tube can be configured to provide streaming videos to users and interface 400 can facilitate navigating and consuming media provided by Media Tube. The interface can include various menus and sections that organize and present media provided by Media Tube. Interface 400 can include a section entitled "Trendsetter Status" 402 that can display information regarding a user's trendsetter status or standing regarding videos the user has been classified as an early consumer of. For example, the user associated with the account displayed via interface 400 has a trendsetter status represented by the symbol 404. In an aspect, symbol 404 can represent a badge or a trophy which a user can collect based on number of popular videos the user has been an early consumer of. For example, in 2013, the user has been an early consumer of 3 videos. In an aspect, a user's trendsetter status can be kept private. However in other aspects, a user can publish his or her trendsetter status to others.

Figure 5:
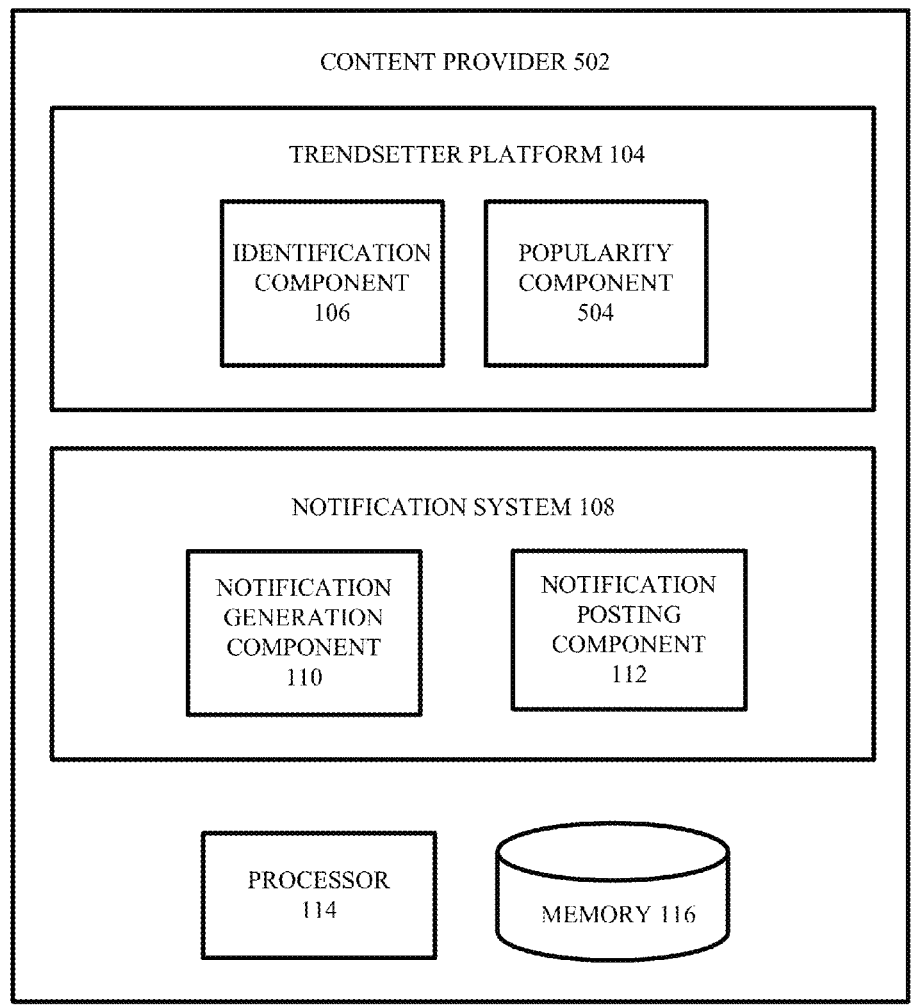
FIG. 5 presents another example system for notifying users that were early consumers of popular media content in accordance with various aspects and embodiments described herein.

FIG. 5 illustrates an example content provider 502 employing trendsetter platform 104 and notification system 108 to facilitate notifying user regarding early consumption of content items provided by content provider 502 in accordance with various aspects and embodiments described herein. Content provider 502 can include same or similar features and functionalities as content provider 102 with the addition of popularity component 504 to trendsetter platform 104. Repetitive description of like elements employed in respective embodiments of systems and interfaces described herein are omitted for sake of brevity.

Popularity component 504 is configured to identify popular content items for which identification component 106 can identify early consumers. As previously noted, the term "popular" is used to describe a relative level of heightened interest a group of users have expressed in a content with respect to other content items. Popularity component 504 is configured to continuously or routinely scan user historical data regarding consumption and interaction with content items to infer or determine content items that are to be deemed popular for purposes of identifying and notifying users that were early consumers of the popular content items. In an aspect, identification component 106 can identify early consumers of content items in response to a classification of the content item as being popular. In some aspects, popularity component 504 can identify content items as being popular amongst a group of users that share a common characteristic (e.g., a common demographic, a common interest, a common location, a common social affiliation, etc.). According to these aspects, popularity component can direct identification component 106 to identify early consumers of the popular content item that also belong to the group.

Popularity component 504 can employ various algorithms and look-up tables stored in memory 116 to facilitate identifying popular content items. In an aspect, popularity component 504 can apply concrete metrics to determine when a content item is popular. For example, popularity component 504 can apply an access threshold requirement whereby a content item is deemed popular after it has been accessed a number of times over the threshold. For instance, popularity component 504 can consider a video popular after it has reached X amount of total views (e.g., 1,000 views, 10,000 views, 100,000 views, 1,000,000 views, etc.). In another example, popularity component 504 can apply a user assess threshold requirement whereby a content item is deemed popular after it has been accessed by over a threshold number of different users. According to this example, re-access of the content item by a same user is not counted.

In another aspect, popularity component 504 can analyze a variety of factors that relate to the popularity of content item to determine or infer a popularity score for a content item that reflects its level of popularity. Popularity component 504 can further consider a content item as popular based on its overall popularity score surpassing a threshold requirement. According to this aspect, in addition to number of times a content item is accessed and number of users to access the content item, popularity component 504 can consider one or more of the following factors when determining or inferring a popularity score for a content item, including but not limited to: recency of access of the content item, number of times the content item was re-accessed by a same user, frequency of re-access, number of times the content item was shared, where the content item was shared, source where the content item was accessed, level of commenting on the content item, location of users that accessed the content item, type of device employed to access the content item, or type of users that accessed the content item.

Threshold requirements associated with measures of popularity (e.g., with respect to number of times a content item is accessed and/or number of users to access a content item before it is deemed popular, number of times the content item is shared/re-shared, where it is shared, level of commenting, etc.) can be standard for all content items or tailored based on the content item, the source of the content item and/or the group of users for which the popularity of the content items is based. For example, popularity component 504 can apply lower access threshold requirements for content items that are articles as opposed to content items that are videos, and vice versa. In another example, popularity component 504 can apply lower overall popularity score requirements for content items associated with a first source than content items associated with a second source. In another example, popularity component 504 can apply lower popularity score threshold requirements when analyzing the popularity of a content item with respect to particular group of users as opposed to another group of users. According to this example, popularity component 504 can analyze popularity of a research article with respect to a group of university professors and with respect to all users. When considering popularity of the research article amongst the group of university professors, popularity component 504 can apply a lower popularity score threshold than that used when considering popularity of the research article amongst all users.

In another aspect, popularity component 504 can tailor or adjust popularity threshold requirements for content items based on the user for which an early consumption notification is to be provided. In particular, popularity component 504 can consider a particular users affinity for a content item or a source of the content item when classifying the content item as popular for the purpose of notifying the user if the user was an early consumer of the content item. For example, if a user has a high affinity for a particular content item or a particular source of the content item (e.g., as determined based on user preferences, user interaction with the content item, user interaction with the content source, etc.), popularity component 504 can apply lower threshold popularity score and/or access requirements for determining popularity of the content item than if the user does not have a high affinity for the particular content item. For instance, where a user has a high affinity for a particular video, popularity component 504 can consider the video popular if it has reached over one million views. On the contrary, where a user does not have a high affinity for a particular video, popularity component 504 can consider the video popular if it has reached over one hundred million views.

Figure 6:
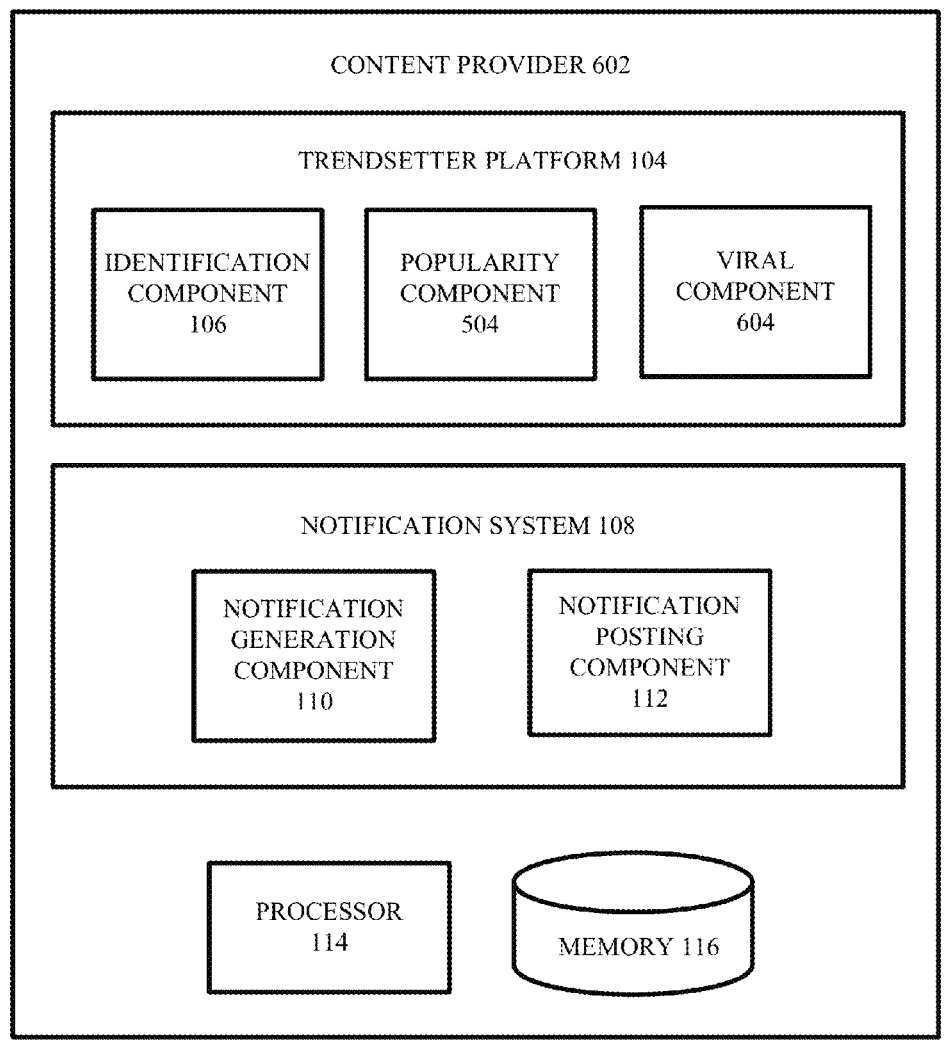
FIG. 6 presents another example system for notifying users that were early consumers of popular media content in accordance with various aspects and embodiments described herein.

FIG. 6 illustrates another example content provider 602 employing trendsetter platform 104 and notification system 108 to facilitate notifying user regarding early consumption of content items provided by content provider 602 in accordance with various aspects and embodiments described herein. Content provider 602 can include same or similar features and functionalities as content provider 502 with the addition of viral component 604 to trendsetter platform 104. Repetitive description of like elements employed in respective embodiments of systems and interfaces described herein are omitted for sake of brevity.

In an aspect, viral component 604 is configured to track the course of development of popularity of a content item and determine or infer a user's level of contribution to the popularity of the content item. According to this aspect, a user's level of contribution to the popularity of a content item can further be included in an early consumption notification provided to the user and contribute to the user's trendsetter status.

In particular, viral component 604 can follow when a content item is shared, who shared it, when it is re-shared and where it is re-shared. For example, viral component 604 can track when a user shares a content item to a first user, when the first user re-shares the content item to a second user, when the second user re-shares the content item to a third user and so on. In other words, viral component 604 can track the course of sharing of a content item and track views of the content item back to the original user who initiated the share that generated the views. In additions to sharing, viral component 604 can also infer or determine a user's level of contribution to the popularity of a content item based on the user's level of commenting on the content item, where the user shares or posts the content item, who the user shares the content item to, how large the user's social circle of friends is to whom the user shared the content item, how many followers the user has, whether the user casted the content item in a positive or negative light, and/or whether the user favorited the content item, In an aspect, notification generation component 110 can include information in an early consumption notification to a user the indicates the user's level of contribution to the popularity of the content item (e.g., as a function of the number of times the user shared the content item and the number of views of the content item that were a direct or indirect effect of the user's respective shares). The user's trendsetter status can further reflect his or her level of contribution to the popularity of the content item. For example, a user that merely was an early consumer of a content item can receive a bronze status, a user that was an early consumer of a content item and shared it once can receive a silver status, and user who was an early consumer of a content item and shared it ten times which resulted in over M number of views can receive a golden status. In another aspect, a user can receive an award based on his or her level of contribution to the popularity of the content item.

In another aspect, viral component 604 can predict or infer content items that will become viral. For example, viral component 604 can track the rate at which a content item is viewed, re-viewed, shared, and re-shared to predict when a content item will go viral. Viral component 604 can also infer whether a content item will go viral based on the popularity of users that view and share the content item (e.g., with respect to trendsetter status, number of friends, number of followers, etc.), where the content item is shared and how it is shared. According to this aspect, notification generation component 110 can include information in an early consumption notification message suggesting content items identified by viral component 604 as content items that may become viral. As a result, user that receive the early notification messages can attempt to be early consumers of the content item before it goes viral in hopes of advancing their trendsetter status and/or receiving an award. In other aspects, viral component 604 can influence the popularity of a content item by promoting content items (e.g., either identified by viral component or selected for other purposes) in early consumption notification messages as content items that "may go viral."

Figure 7:
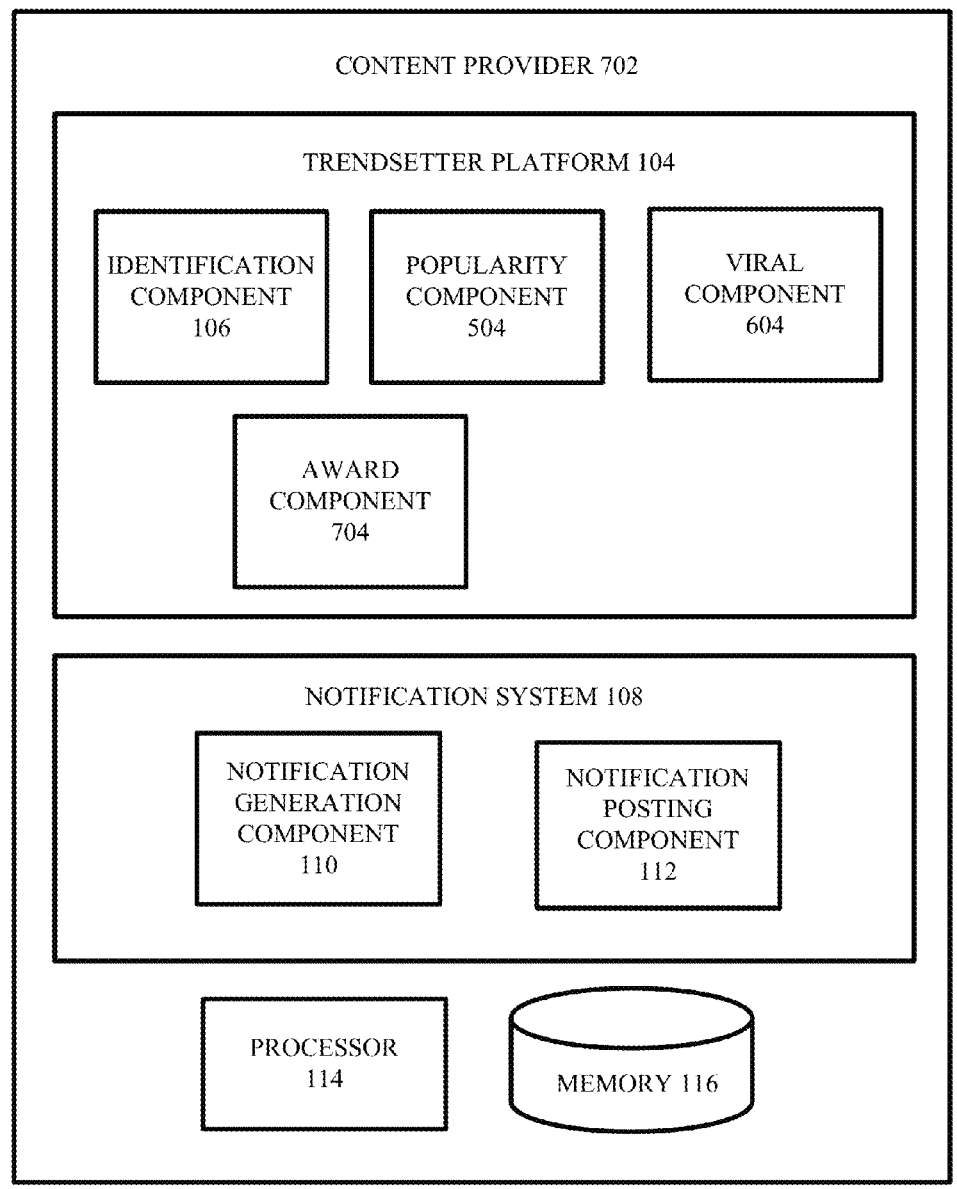
FIG. 7 presents another example system for notifying users that were early consumers of popular media content in accordance with various aspects and embodiments described herein.

FIG. 7 illustrates another example content provider 702 employing trendsetter platform 104 and notification system 108 to facilitate notifying user regarding early consumption of content items provided by content provider 702 in accordance with various aspects and embodiments described herein. Content provider 702 can include same or similar features and functionalities as content provider 602 with the addition of award component 704 to trendsetter platform 104. Repetitive description of like elements employed in respective embodiments of systems and interfaces described herein are omitted for sake of brevity.

Award component 704 is configured to identify and/or generate an award for providing to a user via an early consumer notification based on the user's early consumption of a content item, number of content items the user is an early consumer of, and/or the user's level of contribution to the popularity of a content item (e.g., as determined by viral component 604). For example, award component 704 can identify and/or generate different levels of award for a user based on how early (e.g., with respect to order of access) in a cycle the user consumed a content item. According to this example, when a user is within the first 1% of users to access a content item the user can receive a greater or better award than if the user is within the first 10% of users to access the content item. In another example, award component 704 can identify and/or generate an award for a user based on how many content items of a set of content items the user was an early consumer of and how early the user consumed the respective content items. In another example, award component 704 can identify and/or generate an award for a user based on the user's level of contribution to the popularity of a content item.

Awards identified and/or generated by award component can further be provided to a user with an early consumption notification generated and sent be notification system 108. Award component 704 can apply a variety of different awards to users for being early consumers and/or top trendsetters. In an aspect, an award can include a trophy or a badge. In another aspect, an award can include a coupon for a service or product. Still in another aspect, an award can include cash or a monetary credit. It should be appreciated that a variety of different types of awards can be applied in accordance with aspects and embodiments described herein.

Figure 8:
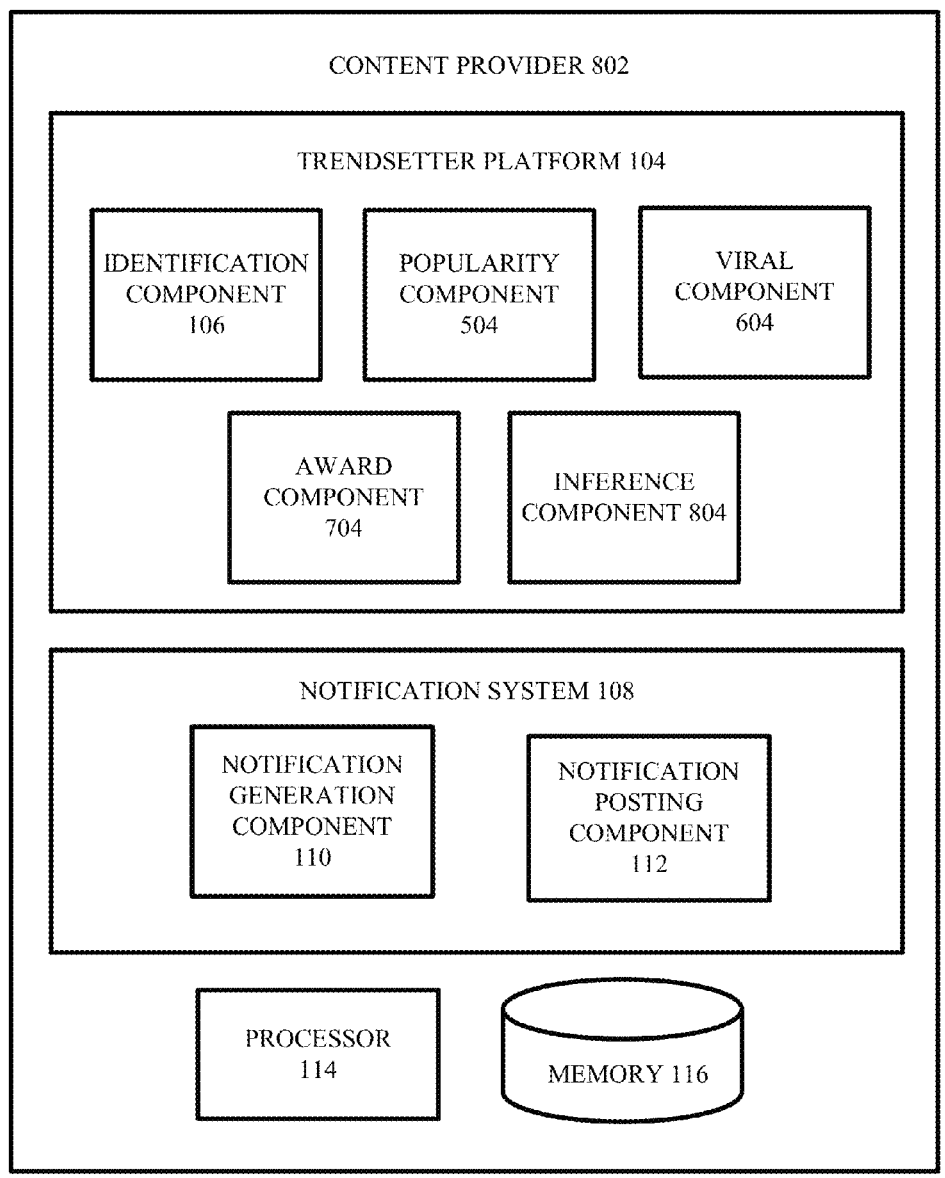
FIG. 8 presents another example system for notifying users that were early consumers of popular media content in accordance with various aspects and embodiments described herein.

FIG. 8 illustrates another example content provider 802 employing trendsetter platform 104 and notification system 108 to facilitate notifying user regarding early consumption of content items provided by content provider 802 in accordance with various aspects and embodiments described herein. Content provider 802 can include same or similar features and functionalities as content provider 602 with the addition of inference component 804 to trendsetter platform 104. Repetitive description of like elements employed in respective embodiments of systems and interfaces described herein are omitted for sake of brevity.

Inference component 804 is configured to provide for or aid in various inferences or determinations associated with aspects of trendsetter platform 104 and notification system 108. In aspect, all or portions of content provider 802 can be operatively coupled to inference component 804. Moreover, inference component 804 can be granted access to all or portions of remote content sources, external information sources and client devices.

In order to provide for or aid in the numerous inferences described herein, inference component 804 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the example systems and/or devices described herein, example methods that can be implemented in accordance with the disclosed subject matter can be further appreciated with reference to flowcharts in FIGS. 9-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 9:
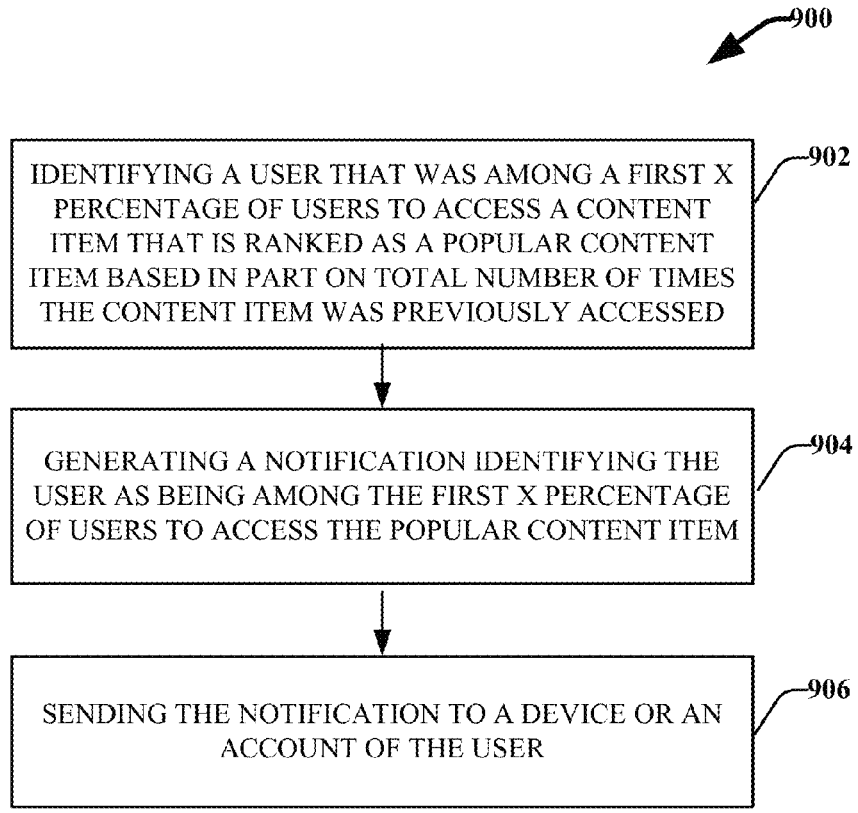
FIG. 9 presents a flow diagram of an example method for notifying users that were early consumers of popular media content in accordance with various aspects and embodiments described herein.

FIG. 9 illustrates a flow chart of an example method 900 for notifying a user regarding early consumption of a popular content item in accordance with aspects described herein. At 902, a user is identified that was among a first X percentage of users to access a content item that is ranked as a popular content item based in part on total number of times the content item was previously accessed (e.g., using identification component 106). At 904, a notification is generated that identifies the user as being among the first X percentage of users to access the popular content item (e.g., using notification generation component 110). At 906, the notification is sent to a device or an account of the user (e.g., using notification posting component 112).

For example, watch histories of all the users that at least watched a portion of a video that was determined to be the one of the top 20 viral videos of 2013 can be analyzed and those users that were within the first 1% of users to view the video (based on order of viewing with respect to the total number of viewers) can be determined. A notification can then be generated and sent to the respective users included in the first 1% (e.g., as an email, as a text message, as a feed item, etc.) congratulating the respective users as being trendsetters and being within the first 1% of users to view the video which is now deemed one of the top viral videos of 2013.

Figure 10:
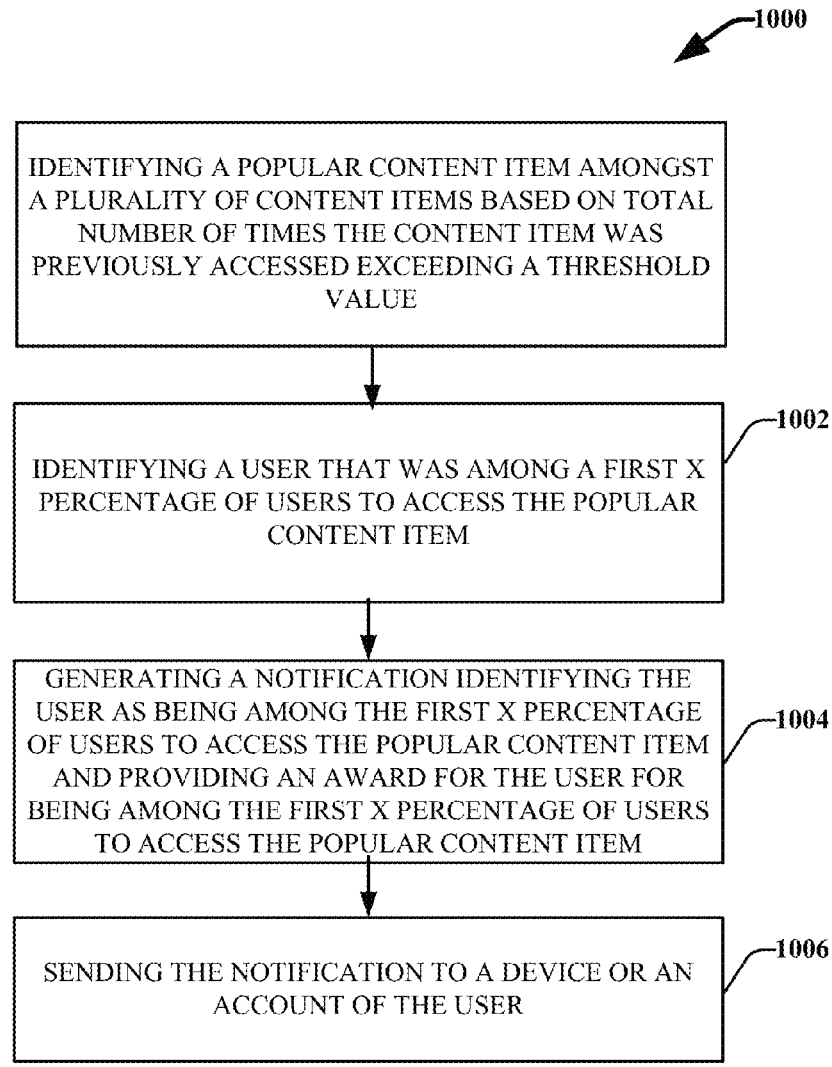
FIG. 10 presents a flow diagram of another example method for notifying users that were early consumers of popular media content in accordance with various aspects and embodiments described herein.

FIG. 10 illustrates a flow chart of another example method 1000 for notifying a user regarding early consumption of a popular content item in accordance with aspects described herein. At 1002, a popular content item is identified amongst a plurality of content items based on total number of times the content item was previously accessed exceeding a threshold value (e.g., using popularity component 504). For example, a set of videos can be analyzed based on number of times the respective videos were viewed within a time period following publication of the respective videos. One or more of the videos that were viewed the most within the time period following publication, (e.g., one week, one month, one year, etc.) can be considered the most popular videos in the set. In another aspect, those videos with more than X number of views (e.g., 1 million) can be considered popular videos. In addition to number of times viewed, a level of popularity of the respective videos can also be determined based on various other factors, including but not limited to, number of times the respective videos were re-watched by a single user, number of viewers of the respective videos, how frequently the videos were shared, where the videos were shared, or level of commenting on the respective videos.

At 1104, a user is identified that was among the first X percent of users to access the popular content item (e.g., using identification component 106). At 1006, a notification is generated that identifies the user as being among the first X percentage of users to access the popular content item and provides an award to the user for being among the first X percentage of users to access the popular content item (e.g., using notification generation component 110 and award component 704). At 1008, the notification is sent to a device or an account of the user (e.g., using notification posting component 112).

Figure 11:
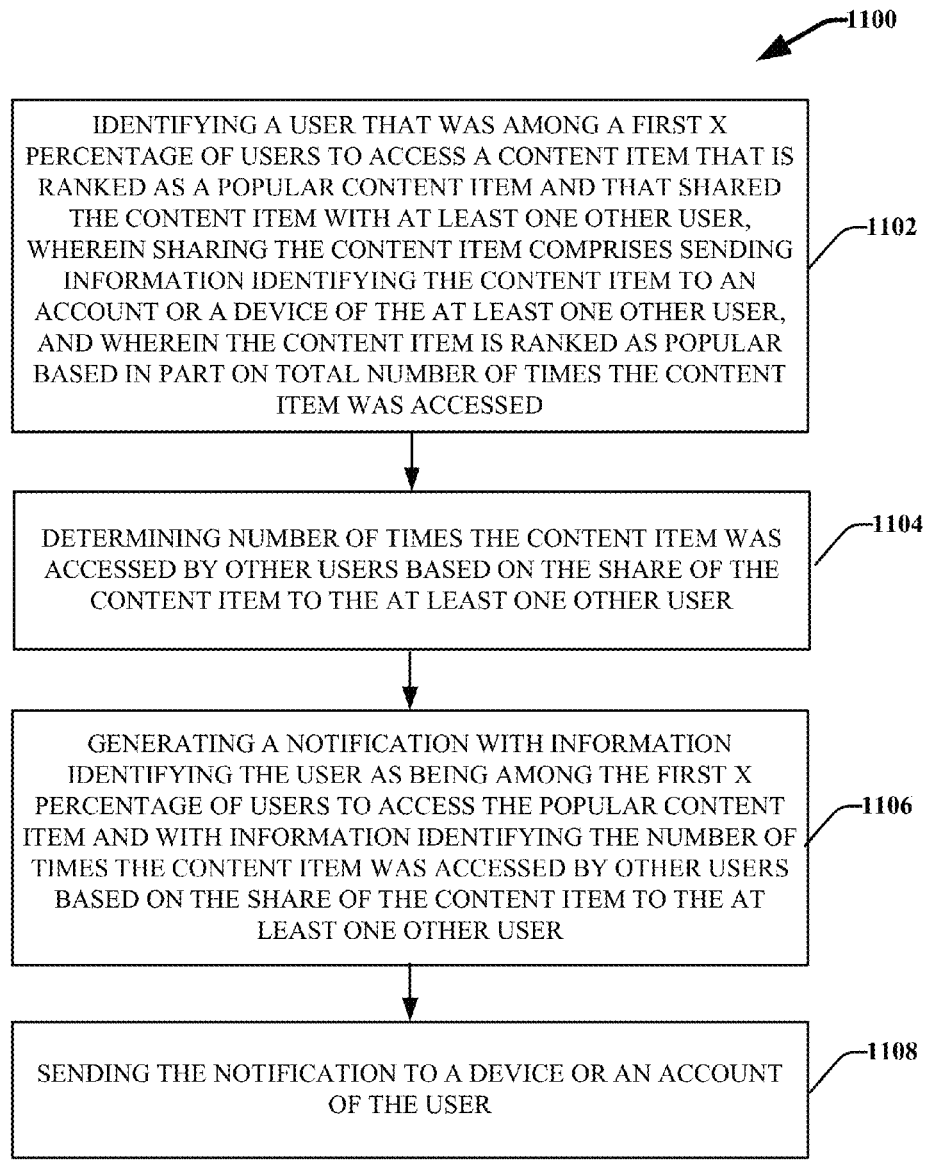
FIG. 11 presents a flow diagram of another example method for notifying users that were early consumers of popular media content in accordance with various aspects and embodiments described herein.

FIG. 11 illustrates a flow chart of another example method 1100 for notifying a user regarding early consumption of a popular content item in accordance with aspects described herein. At 1102, a user is identified that was among a first X percentage of users to access a content item that is ranked as a popular content item and that shared the content item with at least one other user, wherein sharing the content item comprises sending information identifying the content item to an account or a device of the at least one other user, and wherein the content item is ranked as popular based in part on total number of times the content item was previously accessed (e.g., using identification component 106 and viral component 604). For example, a user that was within the first 5% of users to view a video ranked as the 5th most popular video of the month and that shared the video with at least one other user (e.g., via posting the video to his or her social networking profile, emailing a link to the video, texting a link to the video, etc.) can be identified.

At 1104, a number of times the content item was accessed by other users based on the share of the content item to the at least one other user is determined (e.g., using viral component 604). For instance, in furtherance to the above example, in response to sharing a link to the video with the one other user, the viral component can determine number of times the video was viewed in response to selection of the link and number of times the video was viewed in response to the selection of the link after the link was re-shared by another user. In other words, viral component can trace all instances of viewing of the video that were a direct or indirect result of the share.

At 1106, a notification is generated that identifies the user as being among the first X percentage of users to access the popular content item and with information identifying the number of times the content item was accessed by other users based on the share of the content item to the at least one other user (e.g., using notification generation component 110). In an aspect, the information identify the number of times the video was accessed can be provided in the form of a status symbol that reflects the users level of contribution to the popularity of the content item. For example, the notification can indicate that "You drove the video "Domino" to be viewed over 100 times making you a Super trendsetter." At 1108, the notification is sent to a device or an account of the user (e.g., using notification posting component 112).

Figure 12:
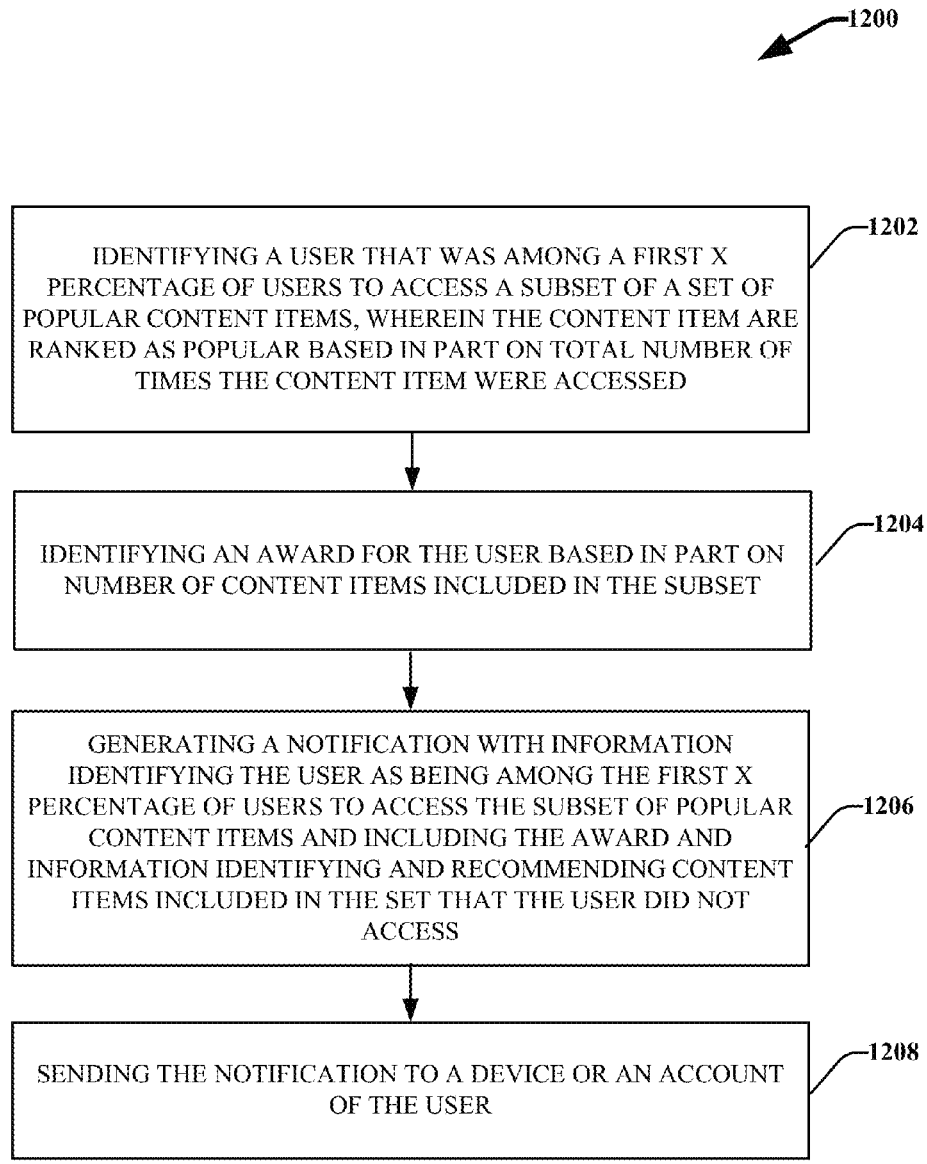
FIG. 12 presents a flow diagram of another example method for notifying users that were early consumers of popular media content in accordance with various aspects and embodiments described herein.

FIG. 12 illustrates a flow chart of another example method 1200 for notifying a user regarding early consumption of a popular content item in accordance with aspects described herein. At 1202, a user is identified that was among a first X percentage of users to access a subset of content items from a set of content items that are ranked as a popular based in part on total number of times the content items were previously accessed (e.g., using identification component 106). At 1204, an award for the user is identified based in part on number of content items included in the subset. For example, a user can receive different levels of prizes (e.g., coupons, trophies, money, etc.) that increase in value based on the number of content items for which the user was an early consumer of and the level of early consumption (e.g., with respect to viewing percentile) of the respective content items. At 1206, a notification is generated that identifies the user as being among the first X percentage of users to access the subset of popular content items, and that includes the award and information identifying and recommending content items included in the set that the user did not access (e.g., using notification generation component 110). At 1208, the notification is sent to a device or an account of the user (e.g., using notification posting component 112).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 13:
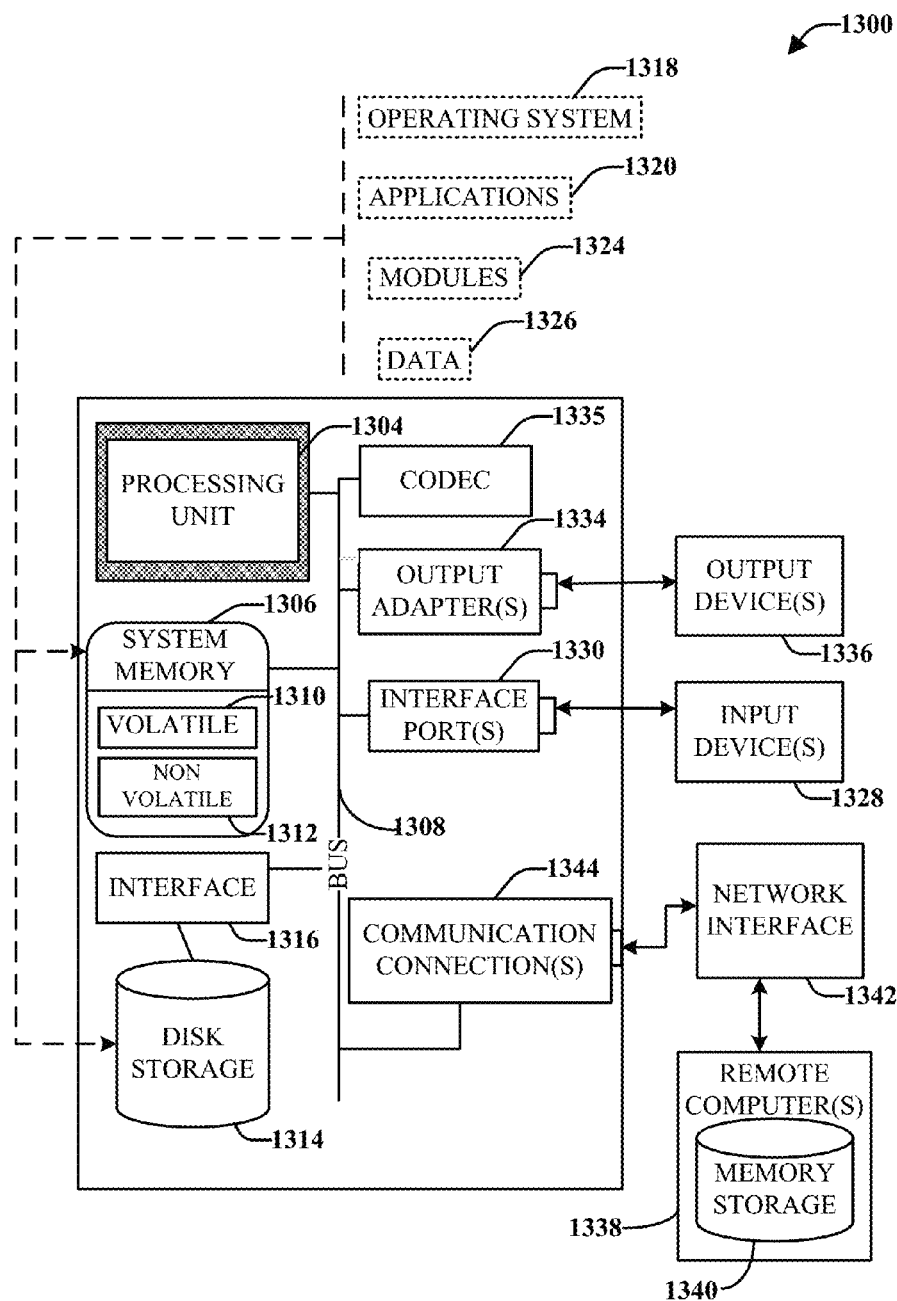
FIG. 13 is a schematic block diagram illustrating a suitable operating environment in accordance with various aspects and embodiments.

With reference to FIG. 13, a suitable environment 1300 for implementing various aspects of the claimed subject matter includes a computer 1302. The computer 1302 includes a processing unit 1304, a system memory 1306, a codec 1305, and a system bus 1308. The system bus 1308 couples system components including, but not limited to, the system memory 1306 to the processing unit 1304. The processing unit 1304 can be any of various available suitable processors. Dual microprocessors and other multiprocessor architectures also can be employed as the processing unit 1304.

The system bus 1308 can be any of several types of suitable bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13134), and Small Computer Systems Interface (SCSI).

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. In addition, according to present innovations, codec 1305 may include at least one of an encoder or decoder, wherein the at least one of an encoder or decoder may consist of hardware, a combination of hardware and software, or software. Although, codec 1305 is depicted as a separate component, codec 1305 may be contained within non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory. According to present aspects, the volatile memory may store the write operation retry logic (not shown in FIG. 13) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1302 may also include removable/non-removable, volatile/non-volatile computer storage medium. FIG. 13 illustrates, for example, disk storage 1314. Disk storage 1314 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316.

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer system 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s). Thus, for example, a USB port may be used to provide input to computer 1302, and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
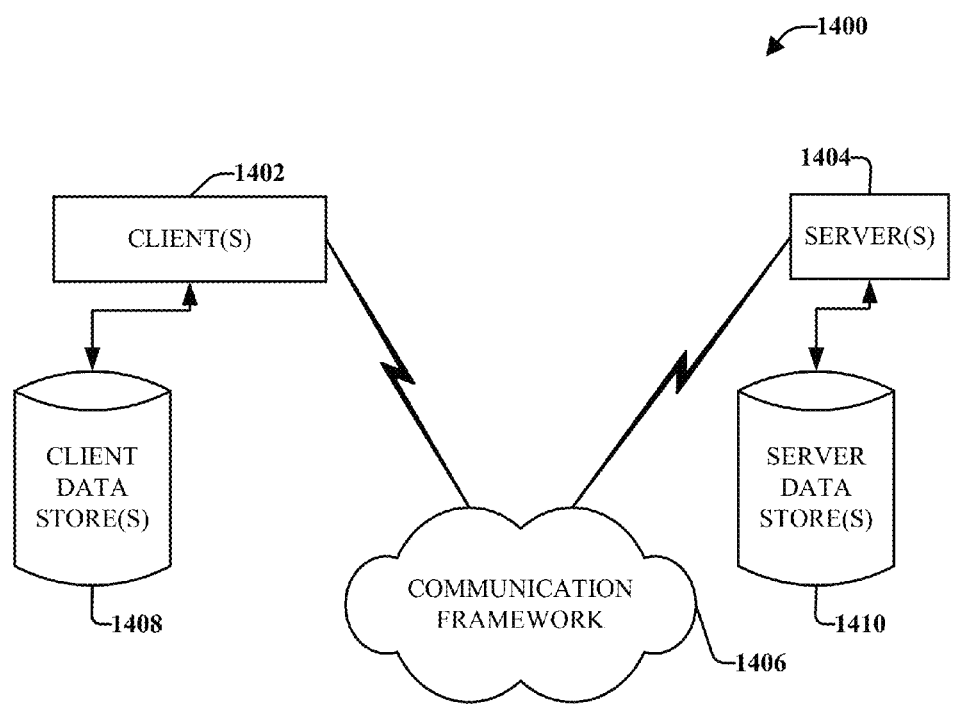
FIG. 14 is a schematic block diagram of a sample-computing environment in accordance with various aspects and embodiments.

Referring now to FIG. 14, there is illustrated a schematic block diagram of a computing environment 1400 in accordance with this disclosure. The system 1400 includes one or more client(s) 1402 (e.g., laptops, smart phones, PDAs, media players, computers, portable electronic devices, tablets, and the like). The client(s) 1402 can be hardware and/or software (e.g., threads, processes, computing devices). The system 1400 also includes one or more server(s) 1404. The server(s) 1404 can also be hardware or hardware in combination with software (e.g., threads, processes, computing devices). The servers 1404 can house threads to perform transformations by employing aspects of this disclosure, for example. One possible communication between a client 1402 and a server 1404 can be in the form of a data packet transmitted between two or more computer processes wherein the data packet may include video data. The data packet can include a metadata, e.g., associated contextual information, for example. The system 1400 includes a communication framework 1406 (e.g., a global communication network such as the Internet, or mobile network(s)) that can be employed to facilitate communications between the client(s) 1402 and the server(s) 1404.

Communications can be facilitated via a wired (including optical fiber) and/or wireless technology. The client(s) 1402 include or are operatively connected to one or more client data store(s) 1408 that can be employed to store information local to the client(s) 1402 (e.g., associated contextual information). Similarly, the server(s) 1404 are operatively include or are operatively connected to one or more server data store(s) 1410 that can be employed to store information local to the servers 1404.

In one embodiment, a client 1402 can transfer an encoded file, in accordance with the disclosed subject matter, to server 1404. Server 1404 can store the file, decode the file, or transmit the file to another client 1402. It is to be appreciated, that a client 1402 can also transfer uncompressed file to a server 1404 and server 1404 can compress the file in accordance with the disclosed subject matter. Likewise, server 1404 can encode video information and transmit the information via communication framework 1406 to one or more clients 1402.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from a computer-readable device or storage media.

What is claimed is:

1. A system, comprising:
a memory;
a hardware processor that, when executing computer executable instructions stored in the memory, is programmed to:
determine that a media content item from a plurality of media content items has been classified as being a popular media content item based on a number of times the media content item has been accessed within a time window;
identify a user having a user account that is deemed to be an early consumer of the popular media content item in response to the determination, wherein the user is deemed as being the early consumer in response to determining (1) that the user consumed the media content item for a duration that exceeds a threshold viewing duration and (2) that the user consumed the media content item at a time that falls within an initial portion of users that accessed the media content item based on an order in which the users accessed the media content item;
generate a user interface that includes a notification identifying the user as being the early consumer of the media content item prior to the media content item being deemed the popular media content item; and
cause the user interface including the notification to be presented on a device associated with the user account of the user.

2. The system of claim 1, wherein the media content item is further classified as the popular media content item based in part on a number of times the media content item was shared or a number of times the media content item was re-accessed by a same user.

3. The system of claim 1, wherein the hardware processor is further programmed to identify another user that accessed the media content item and is also deemed one of early consumers of the media content item wherein the hardware processor is further programmed to receive a request from the another user to share the media content item with at least one other user, wherein sharing the content item comprises sending information identifying the media content item to an account or a device of the at least one other user.

4. The system of claim 3, wherein the hardware processor is further programmed to determine a number of times the media content item was accessed by the other users based on the share of the media content item to the at least one other user.

5. The system of claim 4, wherein the hardware processor is further programmed to generate another notification with information identifying the another user as also being the early consumer of the media content item and with information identifying the number of times the media content item was accessed by other users based on the share of the media content item to the at least one other user.

6. The system of claim 1, wherein the media content item comprises a video and wherein the hardware processor is further programmed to identify the user based on analysis of watch histories of users that watched the video.

7. The system of claim 1, wherein the hardware processor is further programmed to identify popular media content items, including the popular media content item, amongst a plurality of media content items respectively based on total number of times the content items were previously accessed exceeding a threshold value.

8. The system of claim 7, wherein the hardware processor is further programmed to determine the threshold value for one of the plurality of media content items based in part on degree of affinity the user has for the media content item, wherein the degree of affinity is inferred based on a preference of the user.

9. The system of claim 1, wherein the hardware processor is further programmed to:
identify that the user was among a first X percentage of users to respectively access a subset of a set of popular media content items;
generate another notification identifying the user as being among the first X percentage of users to access the subset of the set of popular content media items; and
send the another notification to a device associated with the user account of the user.

10. The system of claim 9, wherein the another notification further identifies and recommends media content items included in the set that the user has not accessed.

11. The system of claim 9, wherein the notification comprises an award based on a number of media content items included in the subset.

12. The system of claim 9, wherein the hardware processor is further programmed to determine summary information identifying when the other user respectively accessed the popular media content items of the subset of media content items with respect to other times the popular media content items were respectively accessed by other users, and wherein the other notification further includes the summary information.

13. The system of claim 12, wherein the user interface including the notification is presented based in part on a recency of a previous notification presented on the device with information related to the user being among a first X percentage of users to access a popular media content item.

14. The system of claim 12, wherein the user interface including the notification is presented based in part on a number of media content items included in the subset of media content items.

15. The system of claim 1, wherein the notification comprises an award based on the user being deemed the early consumer of the media content item.

16. The system of claim 15, wherein the user interface includes the award to the user account for public display.

17. The system of claim 1, wherein the user is deemed the early consumer of the media content item based on the user being among the first X percent of a total number of users to access the content item.

18. The system of claim 17, wherein X is 1.0.

19. A method comprising:
using a hardware processor to execute the following computer executable instructions stored in a memory to perform the following acts:
determining that a media content item from a plurality of media content items has been classified as being a popular media content item based on a number of times the media content item has been accessed within a time window;
identifying a user having a user account that is deemed to be an early consumer of the popular media content item in response to the determination, wherein the user is deemed as being the early consumer in response to determining (1) that the user consumed the media content item for a duration that exceeds a threshold viewing duration and (2) that the user consumed the media content item at a time that falls within an initial portion of users that accessed the media content item based on an order in which the users accessed the media content item;
generating a user interface that includes a notification identifying the user as being the early consumer of the media content item prior to the media content item being deemed the popular media content item; and
causing the user interface including the notification to be presented on a device associated with a user account of the user.

20. The method of claim 19, wherein the media content item is further classified as the popular media content item based in part on a number of times the media content item was shared or a number of times the media content item was re-accessed by a same user.

21. The method of claim 19, further comprising:
identifying another user that accessed the media content item, wherein a request from the another user to share the media content item with at least one other user is received and wherein sharing the media content item comprises sending information identifying the media content item to an account or a device of the at least one other user;
determining a number of times the media content item was accessed by the other users based on the share of the media content item to the at least one other user;
generating another notification with information identifying the user as the early consumer of the media content item and with information identifying the number of times the media content item was accessed by other users based on the share of the media content item to the at least one other user; and
sending the another notification to a device associated with a user account of the user.

22. The method of claim 19, further comprising:
identifying popular media content items, including the popular media content item, amongst a plurality of media content items respectively based on total number of times the media content items were previously accessed exceeding a threshold value.

23. The method of claim 19, further comprising:
identifying that the user was among a first X percentage of users to respectively access a subset of a set of popular media content items;
generating another notification identifying the user as being among the first X percentage of users to access the subset of the set of popular media content items; and
sending the another notification to a device associated with the user account of the user.

24. The method of claim 23, wherein the another notification further comprising including information in the notification that identifies and recommends media content items included in the set that the user has not accessed.

25. The method of claim 23, further comprising providing an award with the notification based on a number of media content items included in the subset.

26. A non-transitory computer-readable storage medium comprising computer-readable instructions that, in response to execution, cause a computing system to perform operations, comprising:
determining that a media content item from a plurality of media content items has been classified as being a popular media content item based on a number of times the media content item has been accessed within a time window;

identifying a user having a user account that is deemed to be an early consumer of the popular media content item in response to the determination, wherein the user is deemed as being the early consumer in response to determining (1) that the user consumed the media content item for a duration that exceeds a threshold viewing duration and (2) that the user consumed the media content item at a time that falls within an initial portion of users that accessed the media content item based on an order in which the users accessed the media content item;

generating a user interface that includes a notification identifying the user as being the early consumer of the media content item prior to the media content item being deemed the popular media content item; and causing the user interface including the notification to be presented on a device associated with a user account of the user.

* * * * *